United States Patent [19]
Aikiyo et al.

[11] Patent Number: 5,745,625
[45] Date of Patent: Apr. 28, 1998

[54] SEMICONDUCTOR LASER MODULE

[75] Inventors: Takeshi Aikiyo; Toshio Kimura, both of Ichihara; Yusei Shirasaka, Chiba, all of Japan

[73] Assignee: The Furukawa Electric Co.,Ltd., Tokyo, Japan

[21] Appl. No.: 707,957

[22] Filed: Sep. 10, 1996

[30] Foreign Application Priority Data

Sep. 28, 1995 [JP] Japan ................................. 7-251389

[51] Int. Cl.⁶ ........................................... G02B 6/36
[52] U.S. Cl. ................... 385/94; 385/93; 385/33; 385/34; 385/35; 385/43
[58] Field of Search .................. 385/33, 34, 35, 385/88–94, 43

[56] References Cited

U.S. PATENT DOCUMENTS 4,842,360  6/1989  Caro et al. ............... 385/33
5,278,929  1/1994  Tanisawa et al. .......... 385/93

FOREIGN PATENT DOCUMENTS 0 192 164  8/1986  European Pat. Off. .
0 490 369  6/1992  European Pat. Off. .

OTHER PUBLICATIONS

M. Saruwatari et al; "Semiconductor laser to single-mode fiber coupler"; Jun. 1, 1979; pp. 1847–1856; Applied Optics, vol. 18, No. 11.

Journal of Lightwave Technology, vol. LT–4, No. 9, Sep. 1986, New York, pp. 1407–1413, "Laser Diode Module for Single-Mode Fiber Based on New Confocal Combination Lens Method".

*Primary Examiner*—John Ngo
*Attorney, Agent, or Firm*—Frishauf, Holtz, Goodman, Langer & Chick

[57] ABSTRACT

A semiconductor laser module comprising a lens system having first and second lenses for coupling a beam emitted from a semiconductor laser with a core expanded fiber having a single-mode fiber end whose core diameter is expanded. The core expanded fiber is set so as to have a core expansion coefficient of 1.3 or more and an absolute value of change rate of mode field diameter smaller than $6.0\times10^{-4}$ $\mu m^{-1}$.

25 Claims, 6 Drawing Sheets

F I G. 7
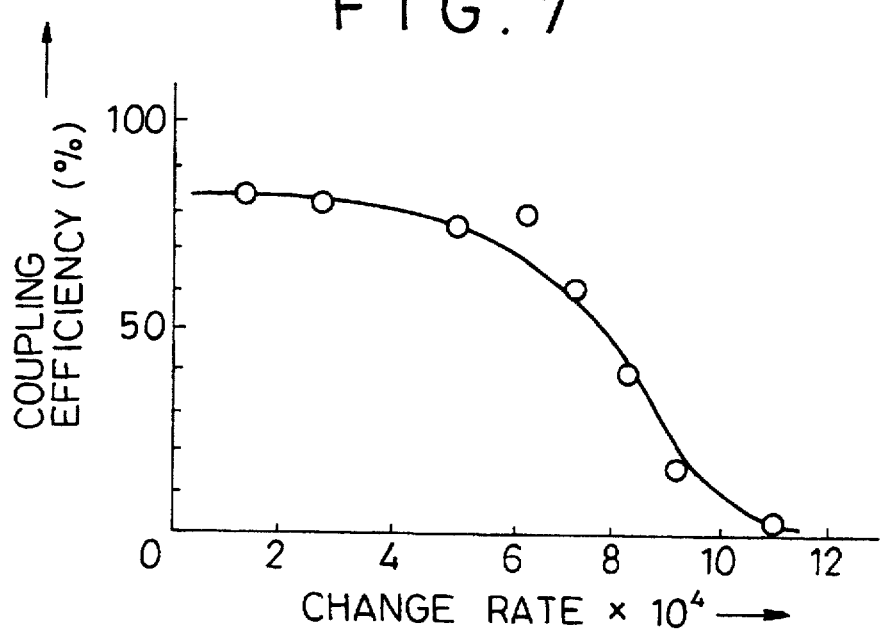
F I G. 8
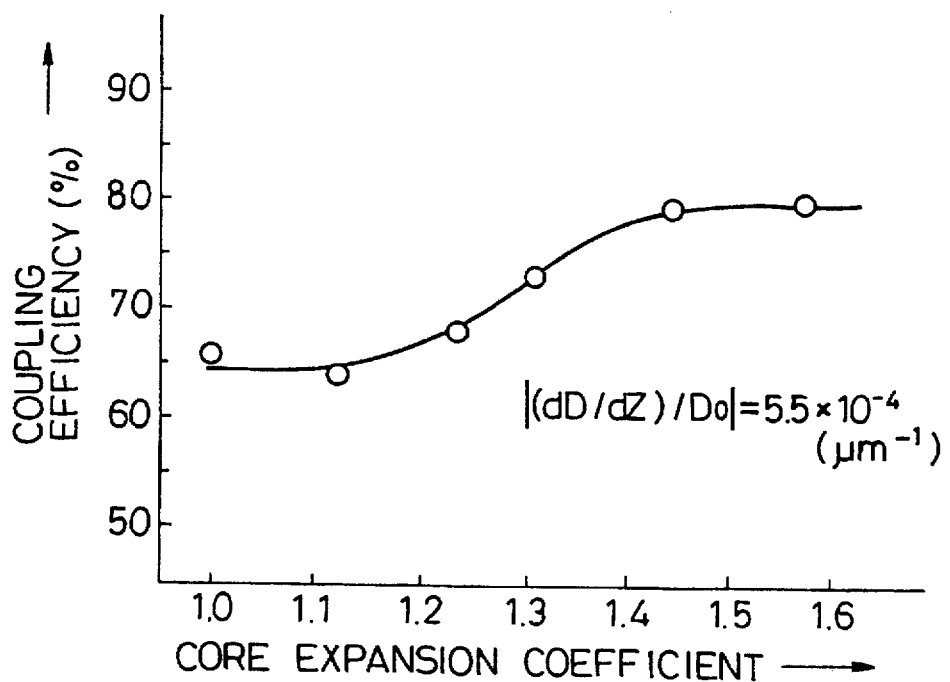

SEMICONDUCTOR LASER MODULE

BACKGROUND OF THE INVENTION

1. Field of the Invention

The present invention relates to a semiconductor laser module.

2. Description of the Prior Art

The research and development of semiconductor lasers which emit light of 980 nm or 1000 nm has so far been conducted vigorously with respect to use as a pumping light source for optical amplification using a rare earth dope fiber.

Conventionally, in order to couple light from a semiconductor laser of, for example, 980 nm upon a single-mode fiber with a high coupling efficiency, a 2-lens coupling optical system 1 using two lenses as shown in FIG. 4 is used. Specifically, the coupling optics 1 has a laser chip 2, a collimator lens 3, a spherical lens 4, and a single-mode fiber 5.

Since the coupling optics 1 has two lenses, it can use a lens with a relatively long focal length as compared with a coupling optical system using one lens. For this reason, the coupling optics 1 is easy to assemble, and allows a relatively large permissible error of component positioning accuracy, so that it has come to be used widely.

The single-mode fiber has a smaller mode field diameter in a wavelength region of 980 nm than in a long wavelength region of 1300 nm, 1550 nm, etc. Therefore, when the coupling optics 1 using a single-mode fiber is assembled into a semiconductor laser module, the decrease in coupling efficiency due to the position shift caused by the welding fixation of single-mode fiber 5 appears more significantly in the 980 nm zone than in the aforesaid long wavelength region.

To solve this problem, the use of a core expanded fiber is effective. Taking the beam spot radius (=mode field radius) of a core expanded fiber and a position shift caused in a plane perpendicular to the optical axis in YAG welding as $\omega$ f and $\Delta$ r, respectively, it is estimated that the coupling efficiency decreases by $\exp(-\Delta r^2/\omega f^2)$ (refer to Appl. Opt., 1979, 18, pp. 1847–1856). Therefore, the use of a core expanded fiber lessens the reduction in coupling efficiency because the beam spot radius becomes larger.

The core expanded fiber having such a characteristic is made by heating the end of a single-mode fiber and by diffusing a dopant of core to the clad side. As shown in FIG. 5, in the core expanded fiber 6, the diameter of core 6b surrounded by the clad 6a (mode field diameter) is large at the end at which the core expanded fiber 6 is heated, and decreases at a position farther from the end. At an unexpanded portion sufficiently far from the end, the core diameter of the single-mode fiber is DO, which is the core diameter before heating.

In the core expanded fiber 6, considering that, usually, the core diameter of the expanded portion is 15 μm, and the core diameter DO of the unexpanded portion is 7 μm, while the length of the expanded portion is about 0.5 to 5 mm, it is found that the core diameter changes gradually.

The laser chip of a short wavelength zone of 980 nm etc. generally has an elliptical mode field having an ellipticity (=major axis/minor axis) of 1.5 or more in the near field. On the other hand, the single-mode fiber usually has a circular mode field. Also, the field of laser beam incident upon the single-mode fiber excites the field of the basic mode in the single-mode fiber, but because the excitation efficiency is limited, a coupling loss is caused by the aforesaid difference in the mode field shape between the two fields.

Taking the radius in the X-axis direction and the radius in the Y-axis direction with respect to the mode field of 0-order Gaussian beam as $\omega$ 1x and $\omega$ 1y, respectively, at the end face of laser crystal, the coupling loss $\eta$ (dB) caused by the difference in mode field shape is given by the following equation (Kenji Kono, "Fundamentals and Applications of Optical Coupling System for Optical Devices", Gendai Kogakusha, Jan. 25, 1991):

$$\log \eta = \log[4/\{(\omega\ 1x/\omega\ 1y)^{1/2} + (\omega\ 1y/\omega\ 1x)^{1/2}\}^2] \qquad (1)$$

Therefore, as far as the coupling of the laser element and the single-mode fiber having a different mode field shape is concerned, the aforesaid coupling loss is inevitable. This is one cause for limiting the output of laser module of a 980 nm zone.

Thus, the inventors of this application, assuming that if a core expanded fiber is used, determined that the decrease in coupling efficiency due to position shift and the decrease in coupling efficiency caused by the difference in mode field shape can be inhibited The coupling efficiency in a semiconductor laser module made by using a single-mode fiber and a core expanded fiber was evaluated.

FIGS. 6A and 6B show the evaluation results of coupling efficiency in a semiconductor laser module made by using a single-mode fiber (FIG. 6A) and a core expanded fiber (FIG. 6B), respectively, and a semiconductor laser element with an ellipticity of 2 and by using a 2-lens system of optimum magnification. From the results shown in FIGS. 6A and 6B, it was found that the percentage of semiconductor laser modules having a high coupling efficiency is higher when a core expanded fiber is used than when a single-mode fiber is used. In the figures, n denotes the number of the evaluated semiconductor laser modules, M denotes the mean value of coupling efficiency for the number n, and $\delta$ denotes the variance of coupling efficiency.

This result cannot be understood from Equation (1) representing the coupling loss. That is, the maximum coupling efficiency which can be achieved between laser the elliptical laser beam and the circular single-mode fiber is determined by the aspect ratio (=$\omega$ 1x/$\omega$ 1y) of the elliptical laser beam only, and should be independent of the mode field diameter of optical fiber, as seen from Equation (1); however, the core expanded fiber actually achieved a higher coupling efficiency.

As described above, in the semiconductor laser module made by using a core expanded fiber, a high coupling efficiency could be achieved.

However, as can be seen from the results shown in FIGS. 6A and 6B, the semiconductor laser module using a core expanded fiber has a problem of having a large variation, that is, a larger variance ($\delta$) of coupling efficiency than that using a single-mode fiber.

SUMMARY OF THE INVENTION

An object of the present invention is to provide a stable semiconductor laser module having a smaller variation in coupling efficiency and a high coupling efficiency between a semiconductor laser and a core expanded fiber.

To achieve the above object, the inventors made studies by conducting various experiments on the causes for the large variation in coupling efficiencies. As a result, it has been found that the coupling efficiency depends on the core expansion coefficient (the ratio of the mode field diameter at the end of core expanded fiber to the mode field diameter of single-mode fiber) and the change rate of mode field diameter.

That is, in the semiconductor laser module using a core expanded fiber, when the change rate of mode field diameter at the core expanded portion of the core expanded fiber is changed, as shown in FIG. 7, the coupling efficiency decreases with the increase in the absolute value of the change rate $(=|(dD/dz)/D0|)$, and the boundary of change is $6.0\times10^{-4}$ $\mu m^{-1}$. When the core expansion coefficient is changed with the absolute value of the change rate kept at $5.5\times10^{-4}$ $\mu m^{-1}$, as shown in FIG. 8, an improvement in coupling efficiency is found in the range where the core expansion coefficient is higher than 1.3.

The present invention was made in view of the above finding, and provides a semiconductor laser module comprising a lens system having first and second lenses for coupling a beam emitted from a semiconductor laser with a core expanded fiber having a single-mode fiber end whose core diameter is expanded, wherein the core expanded fiber is set so as to have a core expansion coefficient of 1.3 or more and an absolute value of change rate of mode field diameter smaller than $6.0\times10^{-4}$ $\mu m^{-1}$.

In this specification, the terms core expansion coefficient and the change rate of mode field diameter in the core expanded fiber are defined as follows:

The core expansion coefficient means a ratio of the mode field diameter at the end of core expanded fiber to the mode field diameter of single-mode fiber. The change rate of mode field diameter means a change rate of mode field diameter at the core expanded portion in the fiber axis direction with the mode field diameter of single-mode fiber being a reference.

If the core expansion coefficient and the change rate of mode field diameter in the core expanded fiber are set as described above, the coupling efficiency between the semiconductor laser and the core expanded fiber is enhanced.

According to the present invention, a stable semiconductor laser module with a high coupling efficiency between the semiconductor laser and the core expanded fiber can be manufactured in high yields.

Preferably, the core expanded fiber has a tip end, at which the core diameter is expanded, formed into a ground face ground obliquely so as to be inclined with respect to the optical axis.

Also, preferably, the tip end of the core expanded fiber, which is inclined with respect to the optical axis, has an angle in the range of 1 to 10 degrees.

Further preferably, the ground face of the core expanded fiber is coated with an antireflection film.

Preferably, the tip end side of the core expanded fiber is held by a metallic cylinder.

Also, preferably, the first lens of the lens system is housed in an hermetic case.

Further preferably, the hermeticity of the hermetic case is kept by a glass plate which is inclined at a predetermined angle with respect to the beam emitted from the semiconductor laser and disposed between the first lens and the second lens.

Preferably, the first and second lenses are arranged so that the optical axes thereof are shifted slightly from each other in the parallel direction.

Also, preferably, the mode shape of the beam emitted from the semiconductor laser is elliptical.

Further preferably, the oscillation wavelength zone of the semiconductor laser is 980 nm zone or 1000 nm zone.

The above and other objects, features, and advantages of the present invention will become more apparent in the following detailed description with reference to the accompanying drawings.

BRIEF DESCRIPTION OF THE DRAWINGS

FIG. 7 is a change characteristic curve showing a relationship between change rate and coupling efficiency in a case where the change rate of mode field diameter at the core expanded portion of core expanded fiber, obtained as the result of study made by the inventors on the semiconductor laser module using a core expanded fiber; and FIG. 8 is a change characteristic curve showing a relationship between core expansion coefficient and coupling efficiency in a case where the expansion coefficient of core is changed while the absolute value of change rate of mode field diameter is kept at $5.5\times10^{-4}$ $\mu m^{-1}$, obtained as the result of study made by the inventors on the semiconductor laser module using a core expanded fiber.

DETAILED DESCRIPTION OF THE PREFERRED EMBODIMENTS

One embodiment of the present invention will be described in detail with reference to FIGS. 1 to 3.

Figure 1:
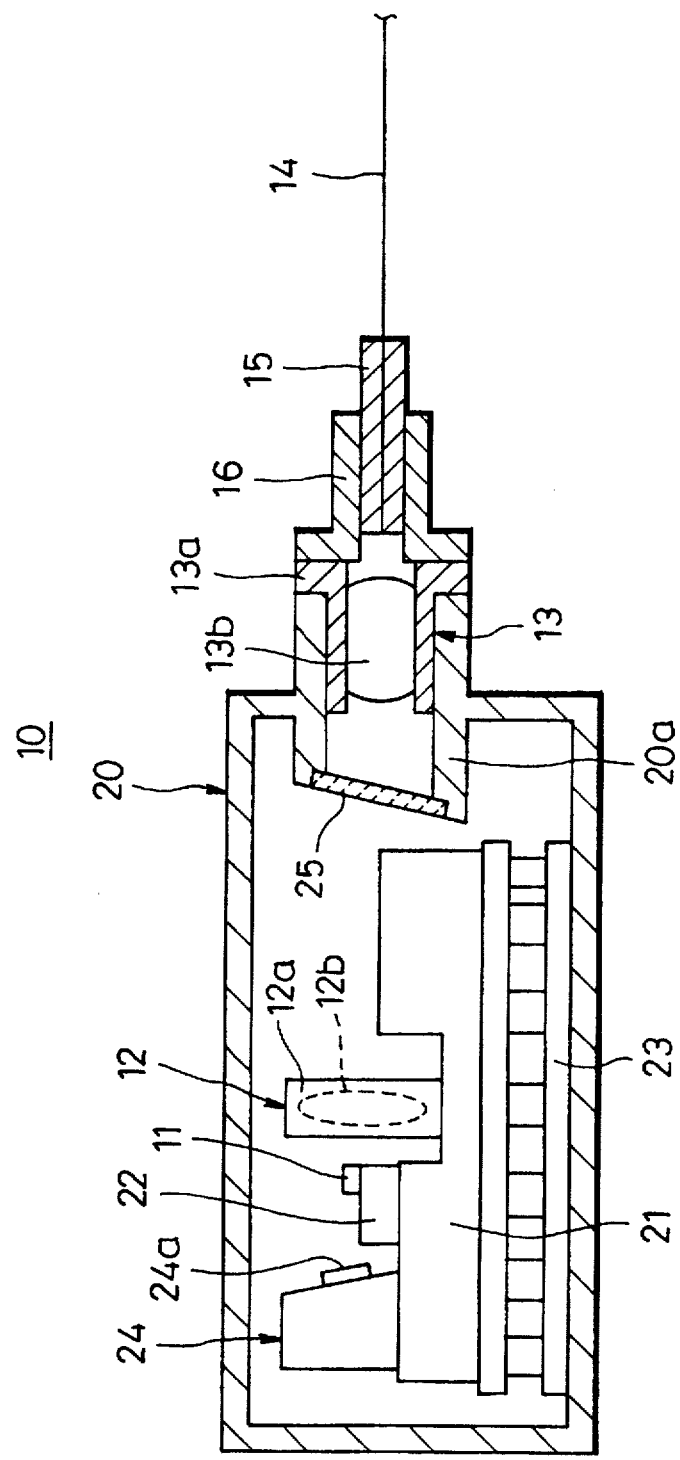
FIG. 1 is a schematic view showing one embodiment of a semiconductor laser module in accordance with the present invention.
Figure 2:
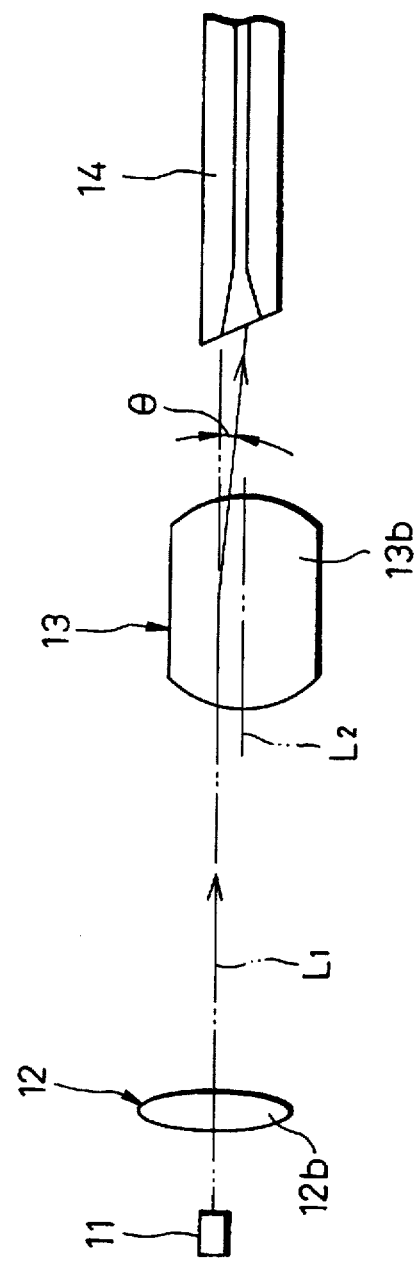
FIG. 2 is an arrangement view showing an arrangement characteristic of an optical system in the module shown in FIG. 1.

As shown in FIG. 1, a semiconductor laser module (hereinafter, simply referred to as a module) 10 has a semiconductor laser 11, a first lens 12, a second lens 13, a core expanded fiber 14, an hermetic case 20, etc.

The semiconductor laser 11 is provided on a base 21 via a chip carrier 22 at a predetermined distance from the first lens 12. The base 21 is fixed over a Peltier element 23 for temperature control provided in the hermetic case 20. The base 21 is made of composite material, in which the main portion is made of copper and the portion on which the first lens 12 is installed is made of a stainless steel composite material. A PD (photo diode) carrier 24 is fixed to the base 21 on the side opposite to the first lens 12 with respect to the chip carrier 22, and a photodiode 24a for monitoring is provided at a position facing the semiconductor laser 11 on the carrier 22.

For the first lens 12, a collimator lens 12b is held by a lens holder 12a. The lens holder 12a is fixed to the base 21 by welding. An aspherical lens is used as the collimator lens 12b to obtain a high coupling efficiency.

For the second lens 13, a spherical lens 13b whose upper and lower portions are cut is held by a lens holder 13a. The lens holder 13a is fixed to an internally projecting cylinder 20a, described later, of the hermetic case 20 with the position thereof being adjusted in the plane perpendicular to the optical axis.

The tip end of the core expanded fiber 14, at which the core is expanded, is ground at an angle of 1° to 10°, preferably 4° to 8°, with respect to the optical axis (refer to FIG. 2), and antireflection coating is applied to the ground face. The tip end side of the core expanded fiber 14 is protected by a metallic cylinder 15. In this embodiment, the angle of the inclined ground face is 6°. The metallic cylinder 15 is fixed by welding to the optimum position of an adjusting member 16. The metallic cylinder 15 is adjusted to the optimum position of the adjusting member 16 by being slid longitudinally along the optical axis of the core expanded fiber 14 and by being rotated around the optical axis in the adjusting member 16.

In order to enhance the coupling efficiency between the semiconductor laser 11 and the core expanded fiber 14, the laser beam emitted from the semiconductor laser 11 must be obliquely incident upon the end face of the core expanded fiber 14. For this reason, in the module 10, as shown in FIG. 2, the second lens 13 is arranged so that the optical axis L2 thereof shifts slightly from the optical axis L1 of the first lens 12 in the parallel direction. Thereupon, the laser beam, which is emitted from the semiconductor laser 11 and passes through the collimator lens 12b, is focused by the spherical lens 13b of the second lens 13 and incident upon the core expanded fiber 14 at the optimum angle. For example, the core expanded fiber 14, which has an inclined angle of 6° on the end face thereof, must be inclined so that the angle θ (FIG. 2) between the laser beam and the optical axis L1 is about 3°.

The internally projecting cylinder 20a protruding inward and outward is provided on one end wall of the hermetic case 20. On the inside of the internally projecting cylinder 20a, a glass plate 25, to the surface of which antireflection coating is applied, is installed at an angle of 10 degrees with respect to the cylinder axis, and therefore, the beam emitted from the semiconductor laser 11 to provide hermetic sealing to the hermetic case 20.

The module 10 in accordance with the present invention is configured as described above, and assembled as described below.

First, the chip carrier 22 to which the semiconductor laser 11 is mounted and the carrier 24 to which the photodiode 24a is mounted are fixed to the base 21.

Next, a laser beam is emitted by exciting the semiconductor laser 11, and in this state, the first lens 12 is arranged ahead of the semiconductor laser 11. Then, the lens holder 12a is fixed to the base 21 by welding at a position such that the laser beam emitted from the collimator lens 12b becomes collimated.

Then, the base 21 is installed on the Peltier element 23 arranged in the hermetic case 20.

Thereafter, the lens holder 13a is inserted in the internally projecting cylinder 20a, the position thereof is adjusted in the plane perpendicular to the axis, and the second lens 13 is fixed to the inserted cylinder 20a by welding. At this time, the position of the lens holder 13a in the axial direction with respect to the inserted cylinder 20a is adjusted so that the laser beam emitted from the spherical lens 13b is incident upon the core expanded fiber 14 at the optimum angle (=about 3°).

Next, the metallic cylinder 15 holding the core expanded fiber 14 is inserted in the adjusting member 16, and the adjusting member 16 is caused to abut on the second lens 13. In this state, a laser beam from the semiconductor laser 11 is caused to be incident upon the core expanded fiber 14, and the optimum position (=the quantity of incident light is at a maximum, that is, the coupling efficiency is at a maximum) of the metallic cylinder 15, and therefore the core expanded fiber with respect to the second lens 13 is determined by sliding the metallic cylinder 15 longitudinally along the optical axis in the adjusting member 16 or by rotating it around the optical axis while the intensity of laser beam is monitored at the end of the core expanded fiber 14.

At this optimum position, the metallic cylinder 15 and the adjusting member 16, and the adjusting member 16 and the lens holder 13a are fixed by welding, respectively, by which the assembly of the module 10 is completed.

A module 10 was assembled by using a core expanded fiber 14 with a core expansion coefficient of 1.44 and an absolute value of change rate of mold field diameter ($=|(dD/dz)/DO\ |$) of $5.5 \times 10^{-4}$ $\mu m^{-1}$, and the coupling efficiency between the semiconductor laser 11 and the core expanded fiber 14 was measured. As a result, a distribution shown in FIG. 3 was obtained. In this figure, n denotes the number of modules 10, M denotes the mean value of coupling efficiency for the number n, and δ denotes the variance of coupling efficiency.

Figure 3:
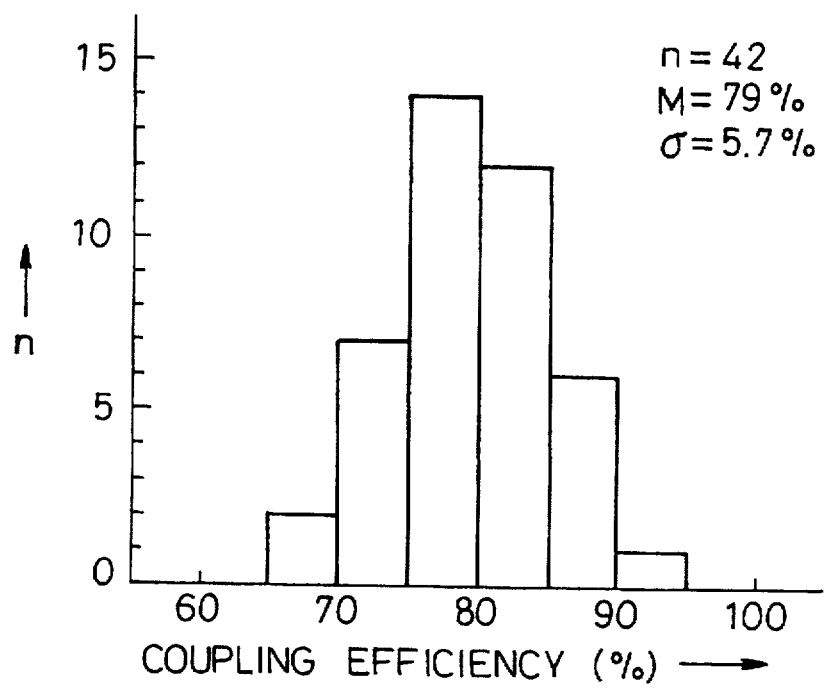
FIG. 3 is a histogram showing the evaluation result of coupling efficiency for the module shown in FIG. 1.
Figure 4:
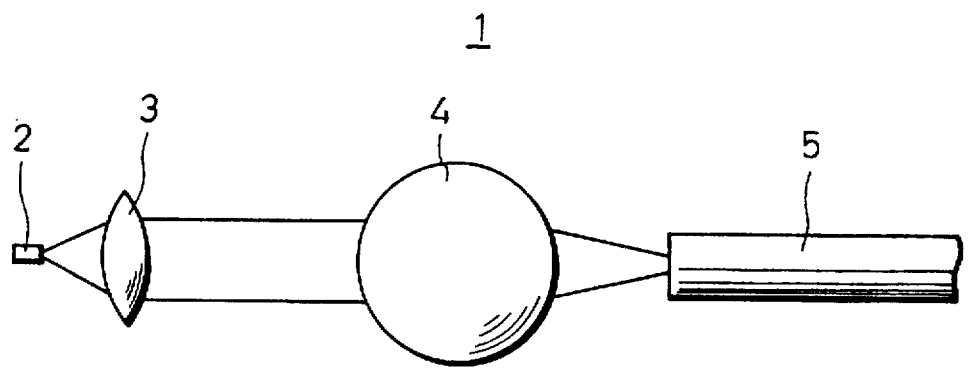
FIG. 4 is a schematic view of a conventional coupling optical system, showing a coupling between a semiconductor laser and a single-mode fiber.
Figure 5:
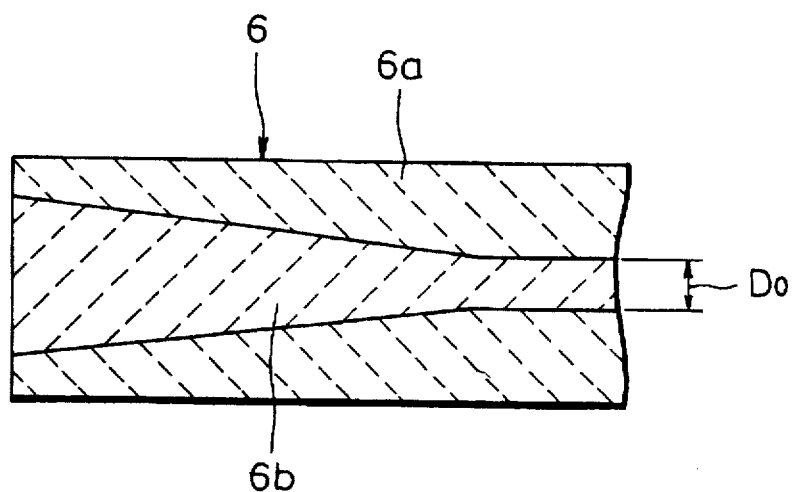
FIG. 5 is a sectional view showing a construction of a conventional core expanded fiber.
Figure 6A:
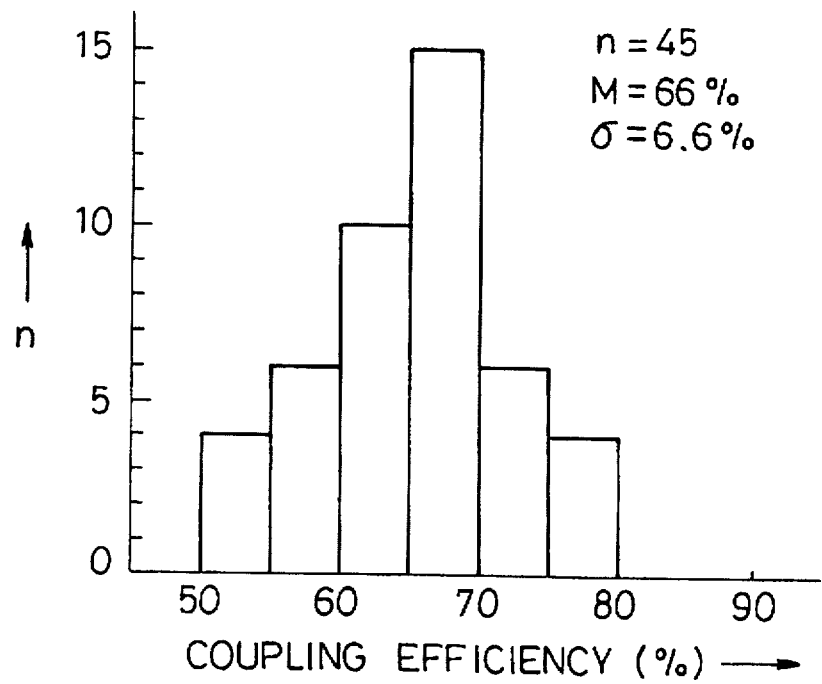
FIGS. 6A and 6B are histograms showing the evaluation results of coupling efficiency in a conventional semiconductor laser module made using a single-mode fiber and a core expanded fiber, respectively.
Figure 6B:
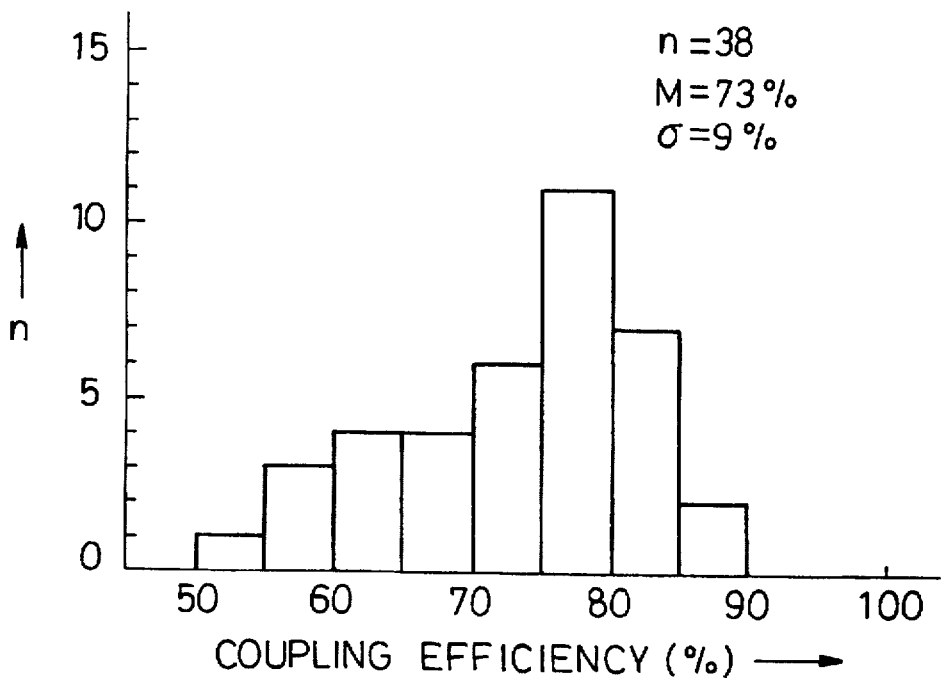

As can be seen from FIG. 3, it was found that by expanding the core of single-mode fiber to a diameter of multi-mode and by setting the absolute value of change rate of mode field at a value smaller than $6.0 \times 10^{-4}$ $\mu m^{-1}$, the variation in coupling efficiencies in the assembled module becomes smaller and a module with a high coupling efficiency can be manufactured stably.

The change rate of mode field diameter in the core expanded fiber 14 can be controlled by various means when the core is expanded by heating the single-mode fiber using a burner. The means include the adjustment of the flow rate of fuel gas, the adjustment of size and temperature of flame, the changing of heated area of fiber by moving the burner, and the adjustment of the distance between the burner and the fiber.

The module of the present invention in accordance with the above described embodiment and the appended claims can be applied to a module of not only 980 nm zone but also 1000 nm zone.

What is claimed is:

1. A semiconductor laser module comprising a lens system having first and second lenses for coupling a beam emitted from a semiconductor laser with a core expanded fiber having a single-mode fiber end whose core diameter is expanded, wherein said core expanded fiber is set so as to have a core expansion coefficient of 1.3 or more and an absolute value of change rate of mode field diameter smaller than $6.0 \times 10^{-4}$ $\mu m^{-1}$.

2. A semiconductor laser module according to claim 1, wherein said core expanded fiber has a tip end, at which the core diameter is expanded, formed into a ground face ground obliquely so as to be inclined with respect to an optical axis of the lens system.

3. A semiconductor laser module according to claim 2, wherein said tip end of said core expanded fiber, which is inclined with respect to the optical axis, has an angle in the range of 1 to 10 degrees.

4. A semiconductor laser module according to claim 2, wherein said ground face of said core expanded fiber is coated with an antireflection film.

5. A semiconductor laser module according to claim 1, wherein said tip end side of said core expanded fiber is held by a metallic cylinder.

6. A semiconductor laser module according to claim 1, wherein the first lens of said lens system is housed in an hermetic case.

7. A semiconductor laser module according to claim 6, wherein said hermetic case is kept hermetic by a glass plate which is inclined at a predetermined angle with respect to the beam emitted from said semiconductor laser and disposed between said first lens and said second lens.

8. A semiconductor laser module according to claim 2, wherein said first and second lenses are arranged so that optical axes thereof are shifted slightly from each other in a parallel direction.

9. A semiconductor laser module according to claim 1, wherein a mode shape of the beam emitted from said semiconductor laser is elliptical.

10. A semiconductor laser module according to claim 1, wherein an oscillation wavelength zone of said semiconductor laser is one of a 980 nm zone and a 1000 nm zone.

11. A semiconductor laser module according to claim 2, wherein a mode shape of the beam emitted from said semiconductor laser is elliptical.

12. A semiconductor laser module according to claim 3, wherein a mode shape of the beam emitted from said semiconductor laser is elliptical.

13. A semiconductor laser module according to claim 4, wherein a mode shape of the beam emitted from said semiconductor laser is elliptical.

14. A semiconductor laser module according to claim 5, wherein a mode shape of the beam emitted from said semiconductor laser is elliptical.

15. A semiconductor laser module according to claim 6, wherein a mode shape of the beam emitted from said semiconductor laser is elliptical.

16. A semiconductor laser module according to claim 7, wherein a mode shape of the beam emitted from said semiconductor laser is elliptical.

17. A semiconductor laser module according to claim 8, wherein a mode shape of the beam emitted from said semiconductor laser is elliptical.

18. A semiconductor laser module according to claim 2, wherein an oscillation wavelength zone of said semiconductor laser is one of a 980 nm zone and a 1000 nm zone.

19. A semiconductor laser module according to claim 3, wherein an oscillation wavelength zone of said semiconductor laser is one of a 980 nm zone and a 1000 nm zone.

20. A semiconductor laser module according to claim 4, wherein an oscillation wavelength zone of said semiconductor laser is one of a 980 nm zone and a 1000 nm zone.

21. A semiconductor laser module according to claim 5, wherein an oscillation wavelength zone of said semiconductor laser is one of a 980 nm zone and a 1000 nm zone.

22. A semiconductor laser module according to claim 6, wherein an oscillation wavelength zone of said semiconductor laser is one of a 980 nm zone and a 1000 nm zone.

23. A semiconductor laser module according to claim 7, wherein an oscillation wavelength zone of said semiconductor laser is one of a 980 nm zone and a 1000 nm zone.

24. A semiconductor laser module according to claim 8, wherein an oscillation wavelength zone of said semiconductor laser is one of a 980 nm zone and a 1000 nm zone.

25. A semiconductor laser module according to claim 9, wherein an oscillation wavelength zone of said semiconductor laser is one of a 980 nm zone and a 1000 nm zone.

\* \* \* \* \*